(12) United States Patent
Fazzi et al.

(10) Patent No.: US 8,811,547 B2
(45) Date of Patent: Aug. 19, 2014

(54) WIDEBAND COMMUNICATION FOR BODY-COUPLED COMMUNICATION SYSTEMS

(75) Inventors: Alberto Fazzi, Eindhoven (NL); Johannes Van Den Homberg, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 536 days.

(21) Appl. No.: 13/125,868

(22) PCT Filed: Oct. 16, 2009

(86) PCT No.: PCT/IB2009/054562
§ 371 (c)(1),
(2), (4) Date: Apr. 25, 2011

(87) PCT Pub. No.: WO2010/049842
PCT Pub. Date: May 6, 2010

(65) Prior Publication Data
US 2011/0200150 A1    Aug. 18, 2011

(30) Foreign Application Priority Data
Oct. 31, 2008  (EP) ................... 08305764

(51) Int. Cl.
*H03D 1/00* (2006.01)
*H04B 13/00* (2006.01)

(52) U.S. Cl.
CPC .................. *H04B 13/005* (2013.01)
USPC .......................................... 375/343

(58) Field of Classification Search
USPC ......... 375/130, 140, 142, 145, 147, 149, 150, 375/316, 340, 343, 354, 346, 350
See application file for complete search history.

(56) References Cited

U.S. PATENT DOCUMENTS

| 6,058,406 A  * | 5/2000  | Karanovic .................. 708/313 |
|---|---|---|
| 6,430,171 B1 * | 8/2002  | Ogami et al. ................ 370/342 |
| 6,678,312 B1 * | 1/2004  | Mohindra ..................... 375/150 |
| 7,136,703 B1 * | 11/2006 | Cappa et al. ...................... 607/9 |
| 8,467,431 B2 * | 6/2013  | Park et al. ..................... 375/146 |
| 2005/0261596 A1 | 11/2005 | Smith |
| 2007/0041116 A1 * | 2/2007 | Kajiwara ....................... 360/51 |
| 2007/0211828 A1 | 9/2007 | Song et al. |

FOREIGN PATENT DOCUMENTS

| EP | 1804382 A2 | 4/2007 |
|---|---|---|
| WO | WO2007145436 A1 | 12/2007 |
| WO | WO2008039030 A1 | 4/2008 |
| WO | WO2008114729 A1 | 9/2008 |

* cited by examiner

*Primary Examiner* — Vineeta Panwalkar
(74) *Attorney, Agent, or Firm* — Larry Liberchuk

(57) ABSTRACT

The present invention relates to a communication apparatus, method and computer program product for providing a reception approach in a body-coupled communication system with a switch-based filtering in order to remove low frequency interference without attenuating the wanted digital signal, and a receiver structure that makes use of correlation for both data detection and synchronization in order to suppress the uncorrelated interference without attenuating the wanted signal.

15 Claims, 10 Drawing Sheets

WIDEBAND COMMUNICATION FOR BODY-COUPLED COMMUNICATION SYSTEMS

FIELD OF THE INVENTION

The present invention relates to a communication device, method and computer program product for processing body-coupled communication signals.

BACKGROUND OF THE INVENTION

Body coupled communications (BCC) or body-based communication has been proposed as a promising alternative to radio frequency (RF) communication as a basis for body area networks. BCC allows exchange of information between a plurality of devices which are at or in close proximity of a body of a human or an animal. This can be achieved by capacitive or galvanic coupling of low-energy electrical fields onto the body surface. Signals are conveyed over the body instead of through the air. As such, the communication is confined to an area close to the body in contrast to RF communications, where a much larger area is covered. Therefore, communication is possible between devices situated on, connected to, or placed close to the body. Moreover, since lower frequencies can be applied than typically applied in RF-based low range communications, it opens the door to low-cost and low-power implementations of body area networks (BANs) or personal area networks (PANs). Hence, the human body is exploited as a communication channel, so that communication can take place with much lower power consumption than in standard radio systems commonly used for BANs (e.g. ZigBee or Bluetooth systems). Since BCC is usually applied in close proximity to the body, it can be used to realize new and intuitive body-device interfaces based on contact or proximity. This creates possibilities for many applications in the field of identification and security.

FIG. 1 shows a schematic diagram indicating involvement of a human body in a BCC communication system. Small-sized BCC devices without direct skin contact can be realized by exploiting capacitive coupling to the human body. A two-electrode TX device generates a variable electric field that is coupled to the human body; a two-electrode RX device senses the variable electric potential of the human body with respect to the environment.

Measurements have shown that a typical body channel has a high-pass character, with a lower corner frequency determined by the input impedance of the RX device and by the capacitance of the electrodes. The signal attenuation is less than 80 dB for devices positioned at various distances on the static or moving human body. With respect to interferences, the body picks-up a significant amount of interferences in the frequency band below 1 MHz, while for higher frequencies the level of interference stays below 70 dBm and their frequency spectrum is to a great extent dependent on the environment. Hence. the established body-channel properties make the frequency band between 1-30 MHz especially attractive for BCC as this band can provide sufficient data-rate for healthcare or consumer applications (up to 10 Mb/s) and the impact of radio frequency (RF) interference is less, as the body does not act as an efficient antenna.

BCC can be technically realized by electric fields that are generated by a small body-worn tag, e.g., being integrated into a credit card or another suitable device attached to or worn in close proximity to the body. This tag capacitively or galavanicly couples a low-power signal to the body. Sometimes this body-coupled communication is referred to as "near-field intra-body communication". BCC is a wireless technology that allows electronic devices on and near the human body to exchange digital information through capacitive or galvanic coupling via the human body itself. Information is transmitted by modulating electric fields and either capacitively or galvanicly coupling tiny currents onto the body. The body conducts the tiny signal to body mounted receivers. The environment (the air and/or earth ground) provides a return path for the transmitted signal.

FIG. 2 shows an exemplary body communication system structure, where data signals are transmitted via couplers placed near or on the body. These couplers transfer the data signal, either galvanic or capacitively, to the body. In the example of FIG. 2, one coupler or electrode provides ground potential GND and the other coupler or electrode is used for transmitting/receiving a signal S. In FIG. 1, transmission is from a transmitter (TX) 10 to a receiver (RX) 20 over an arm is depicted. Generally, every node can in principle act both as transmitter and receiver, i.e., as a transceiver (TRX), and communication can take place from everywhere on the body. Data transfer via a body channel can be used for frequencies from about 100 kHz up to about 100 MHz. Frequencies below 100 kHz can be affected by significant electrostatic interference in the body channel. At frequencies above 100 MHz the wavelength, i.e. <3 m, comes in the range of the length of (parts of) the human body. Consequently, the human body starts to act as an antenna. Consequently, there is the possibility that the BCC nodes located on different bodies can communicate which each other, using the "human body antenna". For even higher frequencies, even the couplers start acting as antennas. Hence, communications can also take place when the (human) body is not present as communication medium. Both effects are unwanted, since only devices placed on or near the same (human) body are supposed to communicate.

Given the characteristic of the body channel and the bandwidth of interest, an interesting solution for BCC proved to be direct coupling of digital wideband signals to the human body without any kind of modulation or up-conversion. The use of wideband digital signals for BCC communication is an efficient way to provide high bit-rate with very low power consumption and simple configurability. Nevertheless, this approach requires a receiver with a bandwidth large enough to correctly receive this kind of signals and consequently open to environmental noise and interference. Receiver architectures proposed so far overcome this problem by performing a significant high-pass filtering and detecting the peaks that correspond to the signal transitions. However, such an approach suffers from the problem that the high pass filtering also attenuates the wideband wanted signal and that the receiver chain is open to interference at higher frequencies which are most likely to appear due to the specific characteristics of the body channel.

SUMMARY OF THE INVENTION

An object of the present invention is to provide an improved wideband data-propagation in body-coupled or body-based communication systems.

This object is achieved by a communication apparatus as claimed in claim 1, a method as claimed in claim 14, and a non-transitory computer readable medium as claimed in claim 15.

Accordingly, the proposed receiver approach enables a transmission of wideband, digital signals via a human or animal body so as to provide the initially mentioned advantages in terms of hardware complexity, energy efficiency and configurability. It makes use of switch-based filtering at the input of a receiver chain, in order to filter-out low frequency interference that is expected in the channel, without attenuating the wanted input signal or without changing its shape. Another advantage of this filtering approach is that the behaviour of the filter is less sensitive to the actual values of the input parasitic capacitances that may be subject to a significant variability between different implementation of the BCC couplers.

Moreover, the proposed reception approach is based on correlation in order to provide data detection as well as time synchronization. This is particularly indicated for the switch-based filtering, because signal detection based on correlation can attenuate interference that is uncorrelated to the expected input signal. This is particularly advantageous because, during the RX period, the receiver may be receptive over a reasonably wide band so it is likely to pick-up a significant amount of interference. The correlator arrangement may be a single correlator or a combined correlator comprising an arrangement of at least two parallel correlators.

According to a first aspect, the proposed communication structure may be implemented for example in a transceiver arrangement or device and may thus as well comprise a coder for coding a body-coupled transmission signal by using signal transitions. This provides the advantage that the coded signal to be transmitted comprises at least one signal transition per transmission period (or chip period), without a DC (direct current) component that would be eliminated by the proposed switch-based filtering. In a more specific example of the first aspect, the coder may be adapted to apply a spreading code and then a Manchester code. The spreading code provides redundancy to achieve a desired target reliability and the Manchester coding ensures that at least one signal transition is provided per transmission period.

According to a second aspect which may be combined with the first aspect, the input filter may be operated at a frequency substantially equal to the data rate of the signal to be received. This measure can ensure that signal transitions at the output of a transmitter side from which the received signal has been received occur within a time period in which a switch of the input filter is open and therefore can be effectively computed.

According a third aspect which can be combined with any one of the first and second aspects, the input filter may be adapted to shorten the input couplers, used for receiving of said body-coupled communication signal, between consecutive receiving periods. This provides the advantage that the bit rate of the received/transmitted signal can be adapted to the application without affecting the effectiveness of the filtering: the mentioned effectiveness depends on the duration of the period in which the switch is open so by simply increasing or decreasing the time during which the input couplers or electrodes are shortened (e.g. the switch is closed).

According to a fourth aspect which can be combined with any one of the first to third aspects, the input filter may further be adapted to DC decouple an amplifier from an input electrode of said communication apparatus and to shorten input and output of said amplifier to periodically reset a DC condition. Thereby, any DC distortions or influences can be prevented.

According to a fifth aspect which can be combined with any one of the first to fourth aspects, the correlator arrangement may comprise a first correlator which provides a phase information indicating a phase difference between the received signal and the synchronization signal (i.e. time reference of the receiver system). The phase information being fed to a timing controller so as to adjust the phase of the time reference of the receiver system. Thereby, a desired synchronization between the transmitter side and the receiver side can be achieved.

According to a sixth aspect which can be combined with any one of the first to fifth aspects, at least one of the first and second correlations may be implemented by analog multiplication of a digital template of the synchronization signal or of the reference signal, respectively, with the received signal. Such an analog approach provides a fast and simple approach where the digital templates may be reduced to one bit only. In a more specific example of the sixth aspect, integrators may be provided for integrating results of the analog multiplications over a receiving period. This would provide a simple determination of the correlation in order to obtain the data and/or synchronization information.

According to a seventh aspect which can be combined with any one of the first to sixth aspects, an oscillator controlled by a sampled output value of said first correlation may be provided, wherein the oscillator may be adapted to generate an internal clock used as a time base for generating the synchronization signal and the reference signal. Hence, an advantageous synchronization loop can be provided. For this purpose the sampled output of the first correlation may be filtered in order to ensure stability of the mentioned synchronization loop.

According to an eighth aspect which can be combined with any one of the first to seventh aspects, a third correlator may be provided for receiving a chip-level output signal of the second correlation and for performing symbol-level synchronization. Thereby, a correct and synchronized code sequence for template generation can be provided. In a more specific example of the eighth aspect, the third correlator may perform a digital correlation and the second correlation may be an analog correlation. This provides as additional advantage that a comparison between the output stream of the analog correlation and the output stream of the digital correlation can be used as a measure of the quality of the received signal.

According to a ninth aspect which can be combined with any one of the first to eighth aspects the communication apparatus may further comprising a polarity control element for controlling the polarity of the output value of the second correlation in accordance with the polarity of the decoded signal, wherein an output of the polarity control element is used to control the oscillator via a filter.

According to an tenth aspect which can be combined with any one of the first to ninth aspects the communication apparatus may further comprising an accumulator for accumulating the output value of the second correlator over a symbol period in order to obtain a symbol level correlation.

It is noted that the communication apparatus may be a receiver, transmitter or transceiver for BCC signals and may be implemented as a discrete hardware circuitry with discrete hardware components, as a integrated chip, as an arrangement of chip modules, or as a signal processing device or chip controlled by a software routine or program stored in a memory. The above implementation options can be provided as a component of a TX and/or RX device as depicted in FIG. 1 and/or FIG. 2.

Further advantageous embodiments are defined below.

BRIEF DESCRIPTION OF THE DRAWINGS

The invention will now be described, by way of example, based on embodiments with reference to the accompanying drawings, wherein.

DESCRIPTION OF PREFERRED EMBODIMENTS

Various embodiments of the present invention will now be described based on a BCC system as an alternative to radio frequency (RF) communication for PANs and BANs. As already mentioned above, BCC signals are conveyed over the body instead of through the air. As such, the communication is confined to an area close to body, in contrast to RF communications, where a much larger area is covered. Therefore, TX and RX devices are situated on, connected to, or placed close to the body. This creates possibilities for many applications in the field of identification and security. Moreover, since lower frequencies can be applied than in RF communications, it opens the door to low-cost and low-power implementations of BAN/PAN. Data signals are not transmitted by antennas but using "couplers", consisting of e.g. electrodes. These couplers are configured to couple, e.g. galvanic or capacitive, the data signals to the body.

Figure 1:
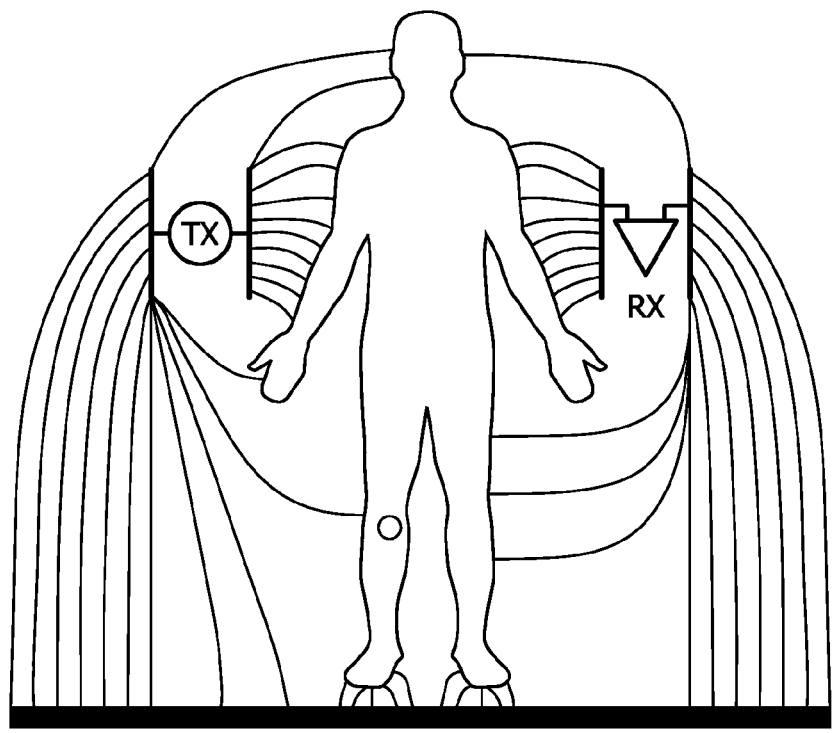
FIG. 1 shows a schematic human body and its involvement in a BCC system.
Figure 2:
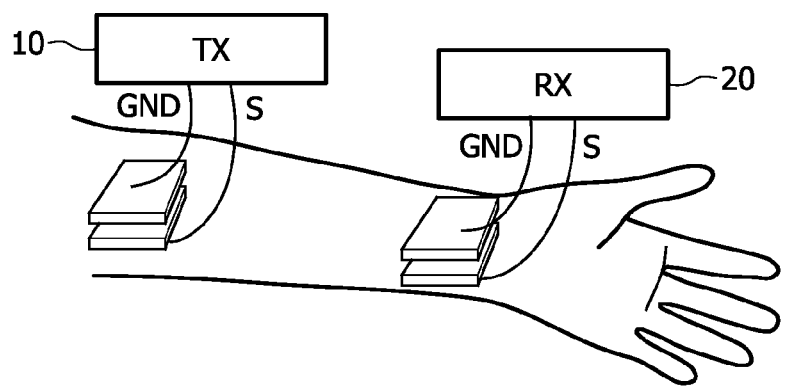
FIG. 2 shows an electrode arrangement of a BCC system.
Figure 3:
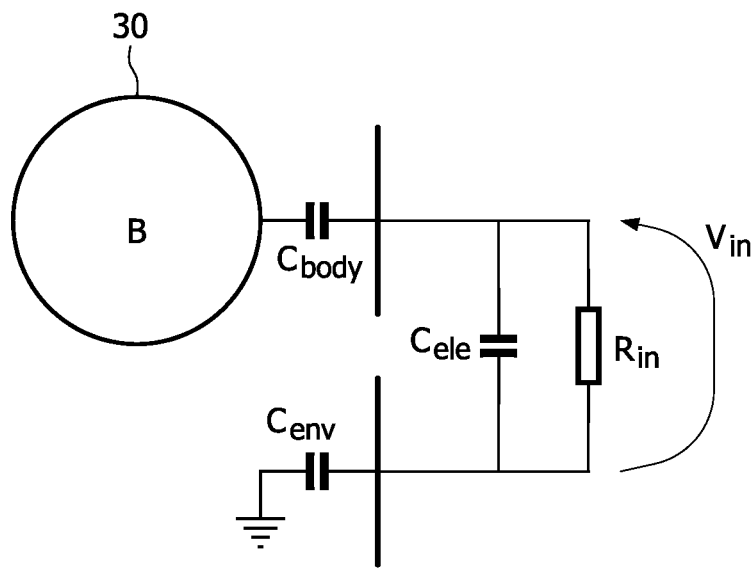
FIG. 3 shows a schematic circuit diagram with a conventional high-pass filtering for the BCC channel.

FIG. 3 shows a schematic circuit diagram of a basic structure of a body coupled communication channel with high-pass filtering in the frequency domain at the receiver node, as proposed in conventional systems.

The receiver is a two electrode device that senses the variations of the electrostatic potential of a human or animal body (B) 30. As a first order approximation, it could be said that one electrode is capacitively coupled to the body 30 via a first capacitance $C_{body}$ while the other electrode is capacitively coupled to an environmental ground via a second capacitance $C_{env}$. The two electrodes are also coupled between each other via a parasitic capacitance $C_{ele}$. Due to the fact that the signal path is AC (alternating current) coupled to the receiver, the input impedance of the receiver itself (here indicated as ohmin resistance $R_{in}$) determines a high pass filtering at the receiver node, with a roll-off frequency approximately equal to $1/2\pi R_{in}(C_{ele}+C_{body}+C_{env})$. However, the resulting high pass filtering converts voltage transitions into pulses.

From this brief description it can be seen that the filtering behaviour strongly depends on the channel parameters (i.e., capacitances $C_{env}$ and $C_{body}$) and these strongly depend on the position of the device with respect to the body and with respect to external conducting elements, thus their value is subject to change during normal functionality. The parasitic capacitance $C_{ele}$ depends mainly on the geometric features of the device. It is mainly a design parameter, but it is advisable to keep it small. If it becomes too large, signal attenuation increases as well, so that it cannot be used to dominate the parasitic behaviour. For this reason, the input bandwidth would be variable as a function of the variability of the coupling parameters.

A second aspect of this problem is that the geometry of the couplers may change from implementation to implementation; therefore, also the input impedance of the receiver system should be tuned in order to be able to maintain the same filtering behaviour.

Finally, another important aspect of this dependency on parasitic effects is that by changing the filtering behaviour the shape of the transient response at the input of receiver changes as well and therefore, if the application of matched filters is required, either the mentioned high-pass behaviour should be finely controlled or the matched filters must but highly tunable.

Nevertheless, high-pass filtering is desirable in BCC systems due to the high level of low frequency interference. Therefore, according to various embodiments described hereinafter, it is proposed to substitute frequency domain filtering with a switch-based filtering.

Figure 4:
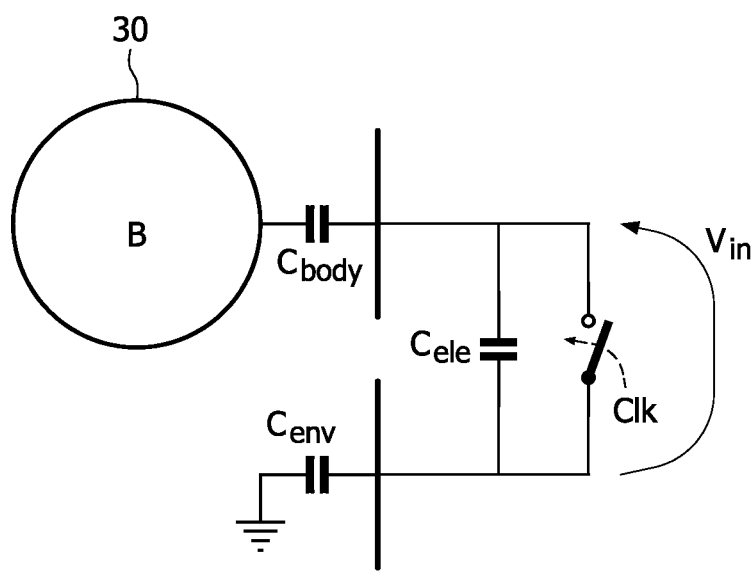
FIG. 4 shows a schematic circuit diagram with a switch-based filtering according to an embodiment.

FIG. 4 shows a schematic circuit diagram of a basic structure of a body coupled communication channel with the proposed switch-based filtering. The resistance $R_{in}$ of FIG. 3 is replaced by a switch or switch arrangement periodically operated based on a control or clock signal Clk. This results in a high-pass filtering in which the corner frequency depends on the operating period of the switch or switch arrangement. It is noted that the switch or switch arrangement can be implemented by any controllable electronic switching element(s), such as semiconductor switching elements or the like.

Figure 5A:
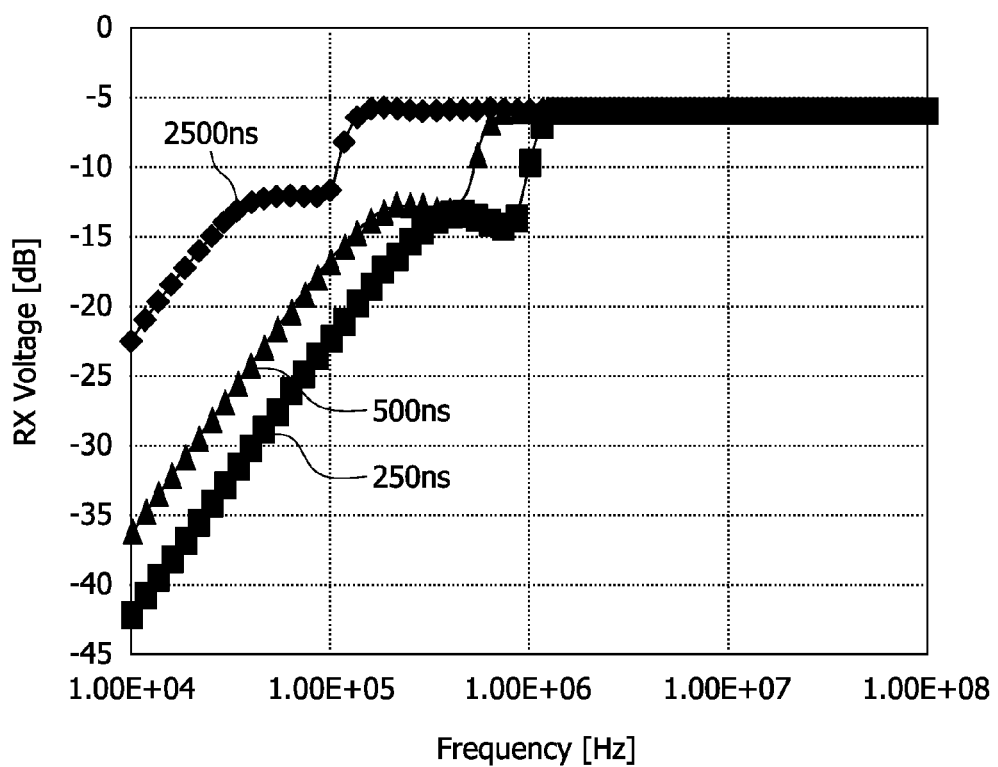
FIGS. 5A and 5B show frequency and time domain responses the switch-based filtering according to the embodiment.
Figure 5B:
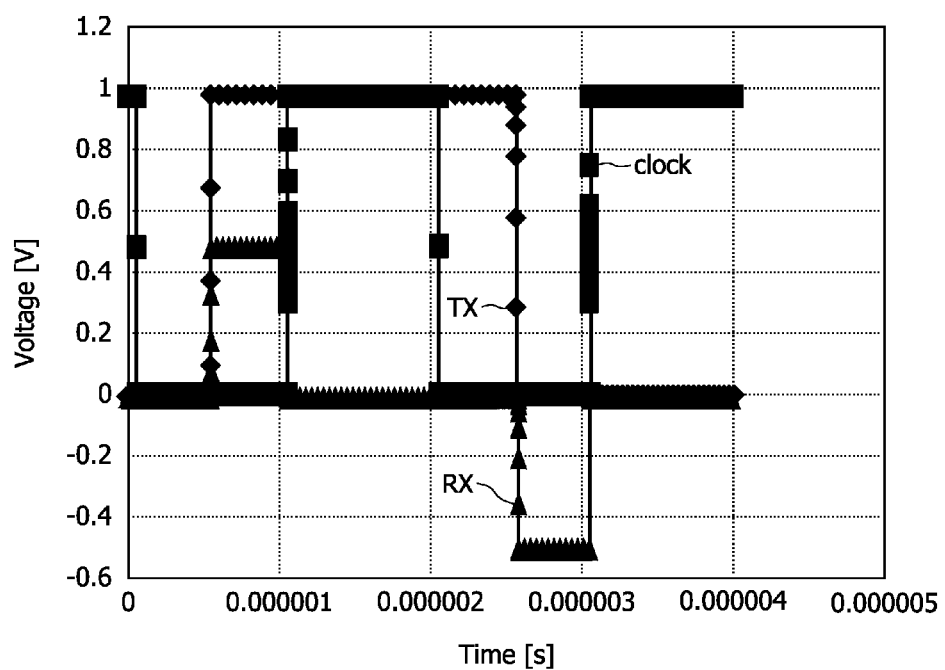

FIGS. 5A and 5B show responses of the switch-based filtering, according to the embodiment, as a function of frequency of the incoming signal and in the time domain. The obtained high pass characteristic is sketched in the left frequency response of FIG. 5A for three different values of the time period for which the switch is open. The effect of this approach is that the filtering capability does not depend any more on the parasitic effects but depends only on the switching period (as long as the time constant of the switch is negligible with respect to the switching speed). On the other hand, the values of the capacitance included in FIG. 4, or more precisely their ratio, determine only the overall attenuation in the pass band.

Moreover, by operating the switch at a frequency that equals the data-rate of the incoming signal and by providing synchronization between transmitter and receiver, it can be guaranteed that signal transitions at the output of the transmitter occur within a time period in which the switch is open. By doing this, the input signal of the receiver presents voltage transitions in which the signal will be coded. At the same time, the shape of the incoming signal will not be translated into pulses but will stay square, as indicated by the time domain diagram of FIG. 5B. Positive and negative signal transitions of the TX signal are converted into respective positive and negative rectangular or square pulses. The advantage of this is that it is then easy to detect the desired input signal by correlating it with a digital template (e.g. a one-bit template), as will be described below. The proposed reception scheme can eliminate DC or low frequency components from the digital bit stream generated at the transmitter. Therefore, the information should be encoded by using signal transitions (such as for example Manchester coding).

Once an optimal period of time for the reception phase has been determined as a function of the desired filtering behaviour (the period of time in which the electrodes are not short-circuited), the repetition rate, or data rate, can be selected in a very simple and flexible way by increasing or decreasing the time in which the electrodes are shorted, between two consecutive reception periods.

Figure 6:
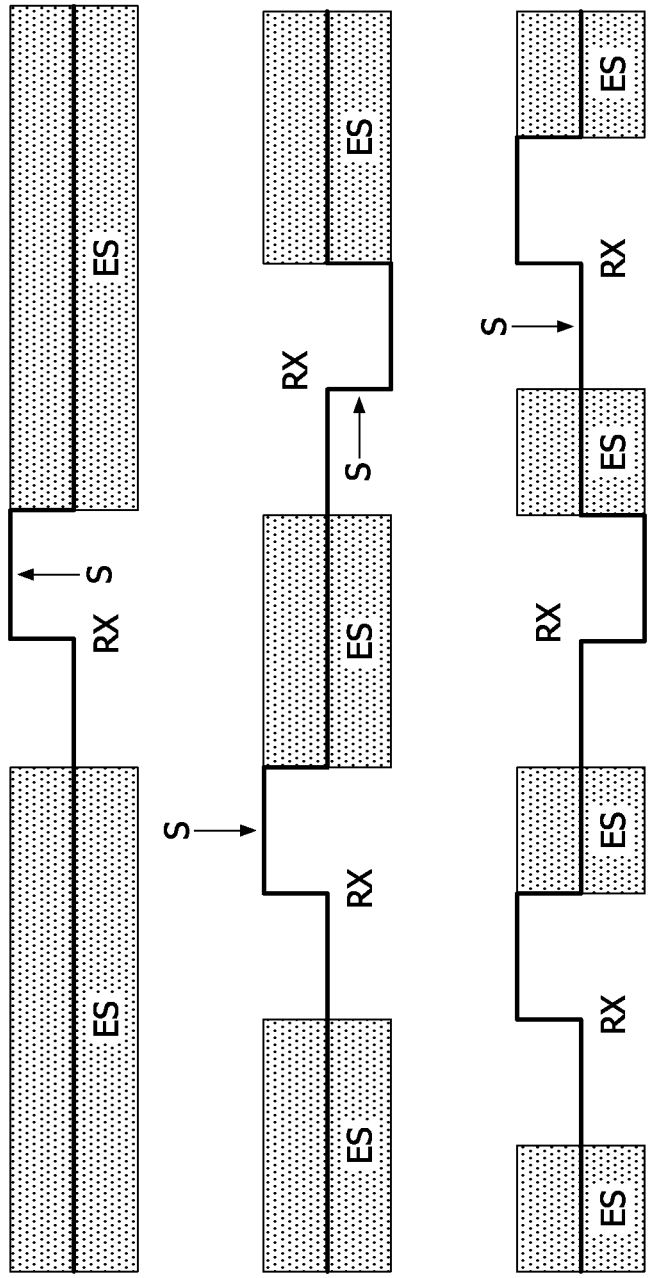
FIG. 6 shows waveform diagrams for different data rate configurations according to the embodiment.

FIG. 6 shows waveform diagrams for different data rate configurations according to the embodiment. The upper waveforms relate to a reduced data rate, the middle waveforms relate to a reference data rate, and the lower waveforms relate to an increased data rate. At the waveforms, periods "ES" indicate time periods during which electrodes are shortened, and periods "RX" indicate reception periods during which an input signal S can be received. A big advantage of this receiver approach is that the bit rate can be changed without affecting the effectiveness of the filtering by simply configuring the digital system that generates the control signal, without the need to reconfigure a set of input filters. It is also interesting to note that, if the time between two separate RX periods is larger than the time needed to switch on and off parts of the RX system (such as the input stages), some of these parts can be switched off during this period in order to increase the overall energy efficiency.

Furthermore, the proposed receiver approach also provides another level of configurability, namely the filter behaviour can be adapted from situation to situation by simply changing the period of time in which the switch is open. Again, this can be done by simply programming a digital system that generates the control signals.

Figure 7:
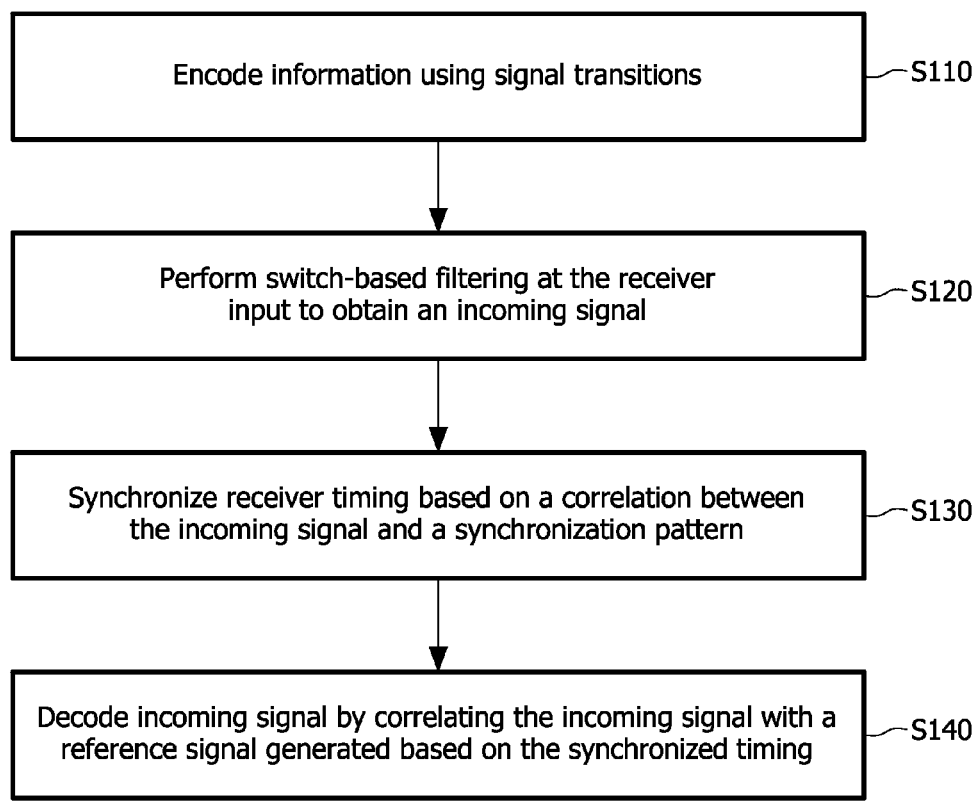
FIG. 7 shows a flow diagram of a wideband transmission approach according to an embodiment.

FIG. 7 shows a schematic flow diagram indicating some steps of a BCC communication according to an embodiment. It is noted that the first step S110 of FIG. 7 relates to a processing at the transmitting side, while the other steps S120 to S140 relate to a processing at receiving side of the BCC communication.

In step S110, information to be transmitted via a BCC channel is encoded using signal transitions to thereby reduce or prevent DC components in the transmission signal. Then, in step S120, the transmitted and encoded signal is received and a switch-based filtering is performed at the receiver input to obtain an incoming signal to be further processed. The incoming signal is used in step S130 to synchronize a receiver timing based on a correlation between the incoming signal and a synchronization pattern or signal so that voltage transitions generated by TX occur within the RX period in the expected moments in time. The synchronized timing is used to generate a reference signal which is correlated in step S140 with the incoming signal in order to decode the incoming signal so as to derive the transmitted information.

The steps of FIG. 7 can be implemented as a program or software routine which controls a processor device (e.g. a central processing unit of a computing device) provided in a BCC transceiver device to provide the suggested wideband communication for BCC systems.

Figure 8:
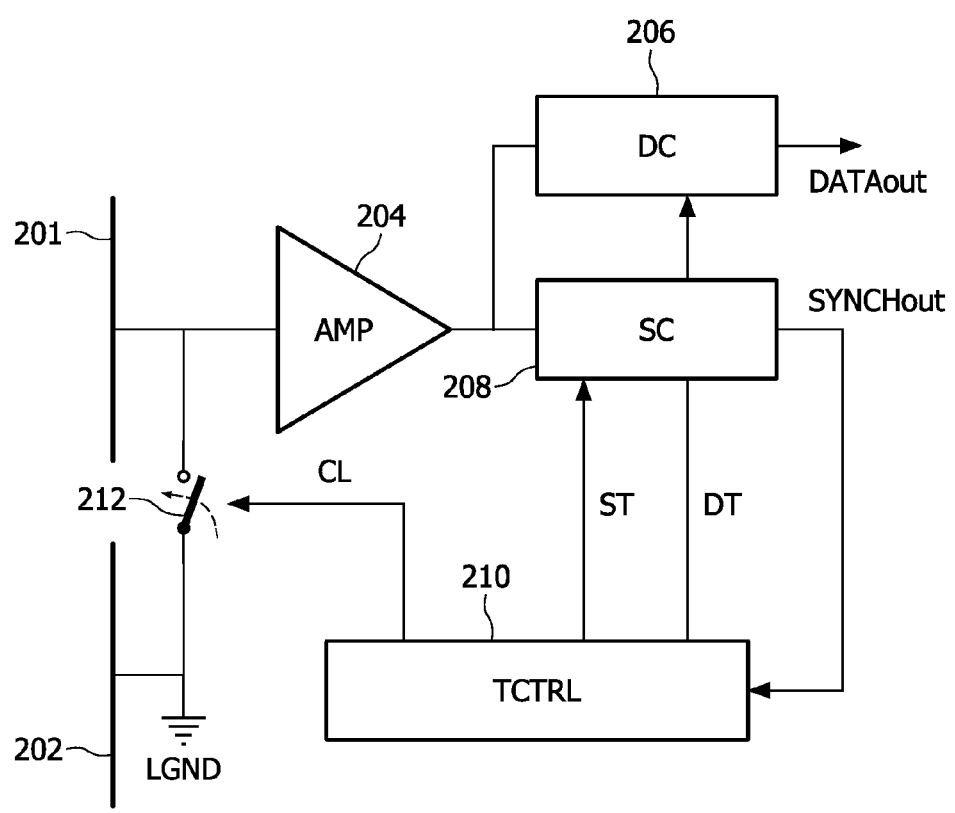
FIG. 8 shows a schematic block diagram of a transceiver device according to an embodiment.

Additionally, it is worth noting that the synchronization process can be continued during the data decoding in order to avoid that the synchronization is lost during the decoding phase FIG. 8 shows a schematic block diagram of a receiver device according to an embodiment. The proposed reception approach leads to reduced hardware requirements and consequently reduced power consumption, leading to higher efficiency of communication. Moreover, the proposed architecture enables a high level of configurability, as most operations can be digitally performed or digitally controlled.

The receiver device comprises or can be connected to two BCC couplers 201, 202, wherein a ground coupler 202 can be connected to local ground (LGND). A switch or switch arrangement 212 is provided for switch-based filtering at the input of the receiver device. Switching can be achieved by shorting the BCC couplers 201, 202 in response to a clamp signal CL generated by a timing control circuit (TCTRL) 210. An amplifier 204 may be provided for amplifying the switched incoming signal. It is worth noting that in the exemplary embodiment of FIG. 8, the amplifier 204 is implemented to perform a single-ended amplification, because one of the couplers (i.e. ground coupler 202) is connected to the local ground which is considered as a reference potential. Of course, other configurations where both couplers 201 and 202 receive a BCC signal or are used as a differential input are also possible.

The received signal is then correlated in a data correlator (DC) 206 with a template signal or reference signal related to the expected incoming signal (e.g. high degree of likelihood in shape or other parameter) to achieve to a suppression of non-wanted components (such as interference or noise) in the received signal. The correlation can be performed at chip level or at symbol level following the selected code, e.g., depending on the level of filtering required to achieve the wanted bit-error-rate. Here, a "chip" is referred to as an information or code portion coded in one single RX period. I.e., every bit may be coded in a symbol that can comprise one or more chips. The output DATAout of the data correlator 206 may for example be properly sliced by applying a one-bit analog-to-digital conversion (by using one comparator, not shown), where the result forms the wanted received bit stream.

Additionally, synchronization between the receiving and transmitting sides must be guaranteed in order to have a good correlation between the incoming signal and the locally generated template (i.e. reference signal). This can be achieved by computing another correlation in a synchronization correlator (SC) 208 which performs correlation between the incoming signal and a synchronization pattern. This correlation may be performed for every RX period and the outcome of this correlation operation may be an information SYNCHout about the phase difference between the template (i.e. synchronization pattern) and incoming signal. The obtained (phase) information SYNCHout is then fed to the timing control circuit 210 which uses it to adjust its internal phase in order to achieve the wanted synchronization between the receiving and transmitting sides.

The use of the switch-based filtering in combination with the proposed correlations provides an efficient reception of BCC signals, since the output of the input stage (switch-based filter and amplifier 204) comprises a series of square, positive or negative, pulses that can be easily correlated with digital patterns (e.g. single-bit digital signals). In addition to the improvements of the receiver structure, the transmitter structure can be simplified as well. A simple digital buffer can be used to couple the digital bit stream used for communication to the human body. The coding to be applied in the transmission device should take care of the fact that the receiver is particularly suited for voltage transitions, rather than static levels.

The proposed receiver approach thus provides a new implementation of a physical layer structure for a BCC protocol stack. The proposal is to transmit a standard digital bit stream. The digital bit stream may have a signal transition for each chip in order to be reliably detected at a receiver node. For this reasons, given a desired bit stream, a spreading code can be applied in order to have enough redundancy to achieve a target reliability, and then Manchester coding or any other type of transition-based coding can be applied to this bit stream in order to achieve at least one voltage transition for each chip period. The resulting bit stream could be directly coupled to the human or animal body or via a low-pass filter which reduces high-frequency components that would be propagated far from the body because of the "human body antenna" effect.

Concerning the packet structure of the data stream, every packet may start with a synchronization pattern that in the present example may be a continuous alternation of "0" and "1" in order to couple to the body a square wave with a frequency that may be equal to the selected chip rate. Other choices for the synchronization sequence are also possible.

Figure 9:
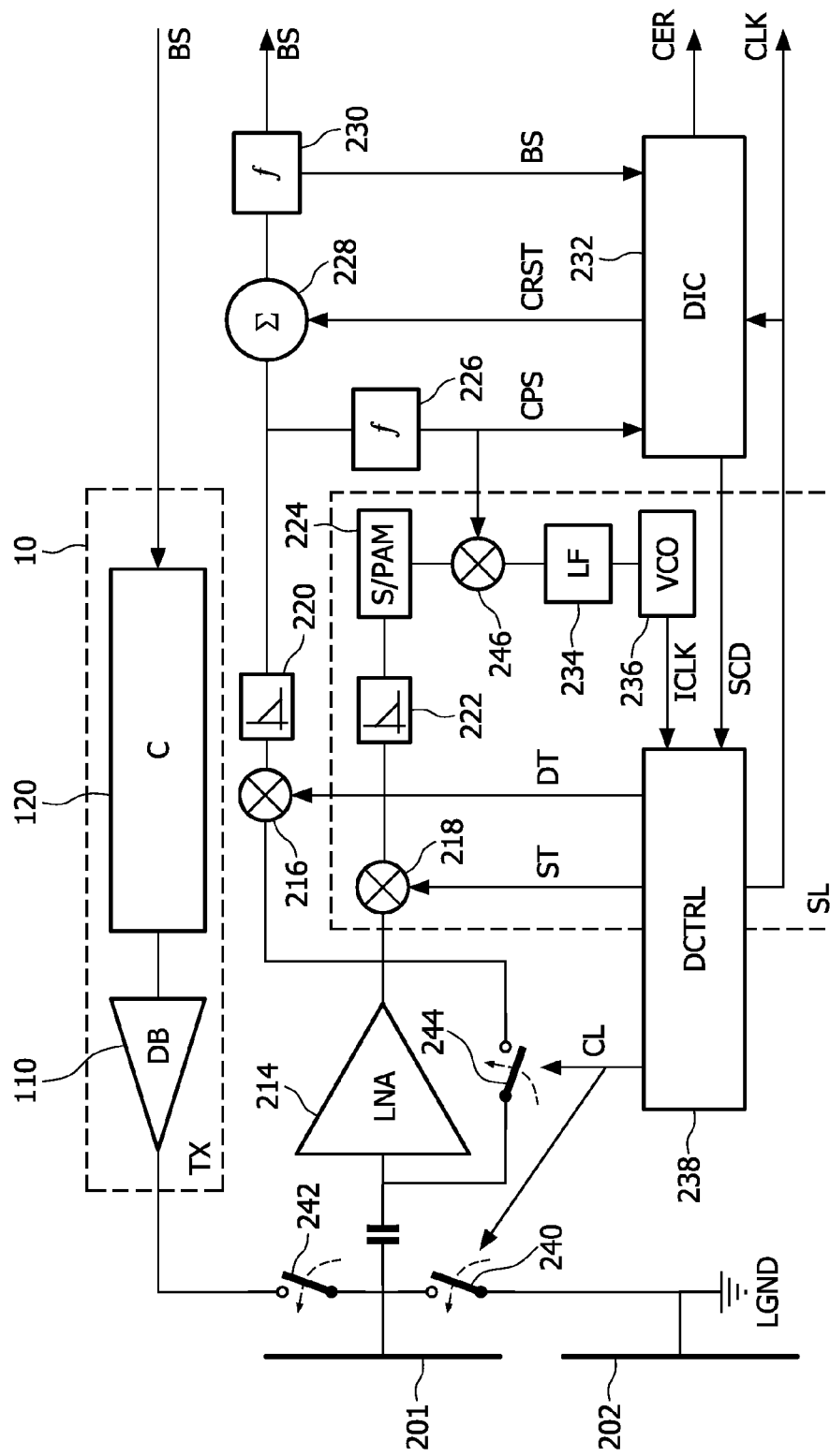
FIG. 9 shows a more detailed schematic block diagram of a transceiver device according to an embodiment.

FIG. 9 shows a more detailed schematic block diagram of a BCC transceiver according to another embodiment.

The transmitter subsystem 10 of the BCC transceiver comprises a coder or coding circuit (C) 120 which codes an bit stream BS to be transmitted in another digital bit stream according to a selected spreading code and according to the requirement of having at least one signal transmission for each chip. Then this bit stream is coupled to the body via a digital buffer (DB) 110 (if needed, the digital buffer 110 could provide also a bandwidth limitation). Furthermore, a first switch or switch arrangement 242 is provided to be able to disconnect the digital buffer 110 from the body couplers or electrodes 201, 202, which are arranged as differential couplers in this embodiment, when an RX mode is selected.

Concerning the receiver subsystem, the proposed switch-based filtering is performed at two levels. First. the differential couplers 201, 202 are shorted between each other by a second switch or switch arrangement 240. Second, an input amplifier (e.g. low noise amplifier (LNA)) 214 is DC decoupled from the input couplers 201, 202 and input and output of the input amplifier 214 are shorted by a third switch or switch arrangement 244 under control of a clamp signal CL generated by a digital controller (DCTRL) 238 to periodically reset the DC condition.

Other configurations are also possible and more of the above receiver input blocks could be cascaded in order to implement a multi-stage amplifier.

The amplified signal is then fed to two correlator circuits used for data detection and synchronization. In the present example, both correlators are implemented by analog multiplication of digital templates (e.g. a 1-bit-template ST as synchronization pattern for the synchronization and a 1-bit-template DT as reference signal for the data detection) with the incoming signal in respective data or synchronization multipliers 216, 218. When the synchronization template is "1" the amplified signal is multiplied by "1" (i.e. by a positive, constant, multiplication factor) at the synchronization multiplier 218. When the synchronization template is "0", the amplified signal is multiplied by "−1" (i.e. by a negative, constant, multiplication factor) at the synchronization multiplier 218. The results of the multiplications are then integrated in respective data or synchronization integrators 220, 222 over the RX period (e.g. chip period) to actually compute the respective data or synchronization correlation. The integration outputs correspond to the desired data and synchronization information.

In order to close the chip level synchronization loop SL, the correlation between the synchronization template and the incoming signal is sampled at the end of the integration period by a sampling and pulse amplitude modulation (PAM) circuit (S/PAM) 224. The sampled PAM value can now be multiplied in a further multiplier 246 by "+1" or "−1" according to the polarity of the detected data (CPS) in order to guarantee the right polarity according to the incoming data. During the mentioned synchronization sequence the polarity selection can be performed by using a fixed synchronization pattern compliant with the synchronization sequence generated by the transmitter subsystem. The further multiplier 246 thus acts as a polarity control element which controls the polarity of the output value of the second correlator in accordance with the polarity of the detected data (i.e. decoded signal). The signal from the multiplier 246 is then filtered in a loop-filter (LF) 234 and fed to a voltage-controlled oscillator (VCO) 236 that generates based on its input an internal clock ICLK used as a time base or time reference for the generation of the control and template signals (e.g. clamp signal CL, synchronization template ST, reference template DT, clock signal CLK) at the digital controller 238. The filtering of the synchronization information is thus performed by generating a pulse (PAM signal) proportional to the sampled signal that is then filtered at the loop filter 234.

Concerning the data detection branch, the correlation at the data correlator can be performed at chip-level and can be first converted to a digital bit stream CPS by using a comparator 226 and fed to a digital correlator (DIC) 232 that performs a symbol level synchronization and provides a correct and synchronized code sequence SCD for template generation at the digital controller 238. Moreover, if analogue correlation at symbol level is also required for reliability reasons, the analogue output of the chip level correlator can be further integrated over the symbol length in an analog accumulator 228 and the digital correlator 232 can control the accumulation time over the symbols by generating an analogue correlator reset signal CRST and supplying it to the analog accumulator 228. The symbol-level correlation is then converted to digital by using a comparator 230 to provide the desired bit stream BS. If reliability is not a problem the analog accumulator can be omitted and the digital correlator can be used for symbol level correlation.

As an additional option, a comparison between the output bit stream BS, coming from the analogue symbol-level correlator and an expected bit stream generated by the digital correlator, could be used as a measure of the quality of the incoming signal, which could be referred to and output as Chip-Error-Rate signal CER.

It is worth noting that several additions to this structure can be made. As an example, a rotational frequency detector could be added that applies a one-bit analogue-to-digital conversion to the outputs of the chip-level analog correlators (one for the data branch and one for the synchronization branch). The obtained two-bit information can be then used to detect the sign of the frequency difference between the receiving side and the transmitting side by monitoring its evolution in time. This can be used to increase the pull-in range of the synchronization system and therefore allow synchronization even without an accurate time reference such as a crystal oscillator of the like.

In the following, schematic circuit diagrams of the input amplifier 214, the PAM circuit 224 and correlators are described with reference to FIGS. 10 to 12.

Figure 10:
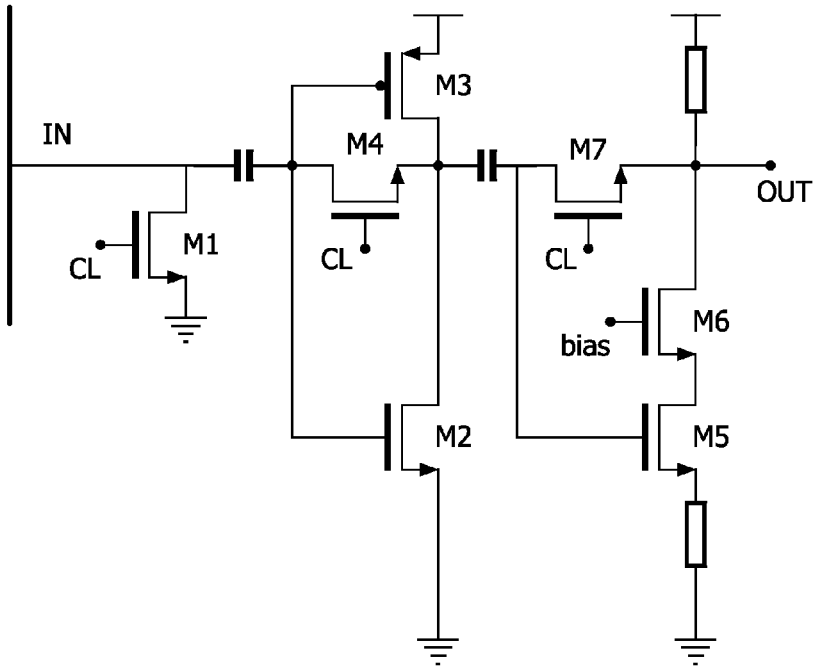
FIG. 10 shows a schematic circuit diagram of an amplifier circuit used in an embodiment.

FIG. 10 shows a schematic circuit diagram of a low noise amplifier circuit which can be used as the input amplifier 214 of FIG. 9. The LNA is a two stage single-ended amplifier. The first stage is a CMOS inverter with transistors M2 and M3. The second stage is a common source amplifier with transistors M5 and M6 with resistive load and local feedback for improved linearity. The additional transistors M1, M4 and M7 implement the clamping functionality and are controlled by the clamp signal CL issued by the digital controller 238 of FIG. 9. In an exemplary circuit the overall LNA gain and bandwidth may be, respectively, 40 dB and 30 MHz.

Figure 11:
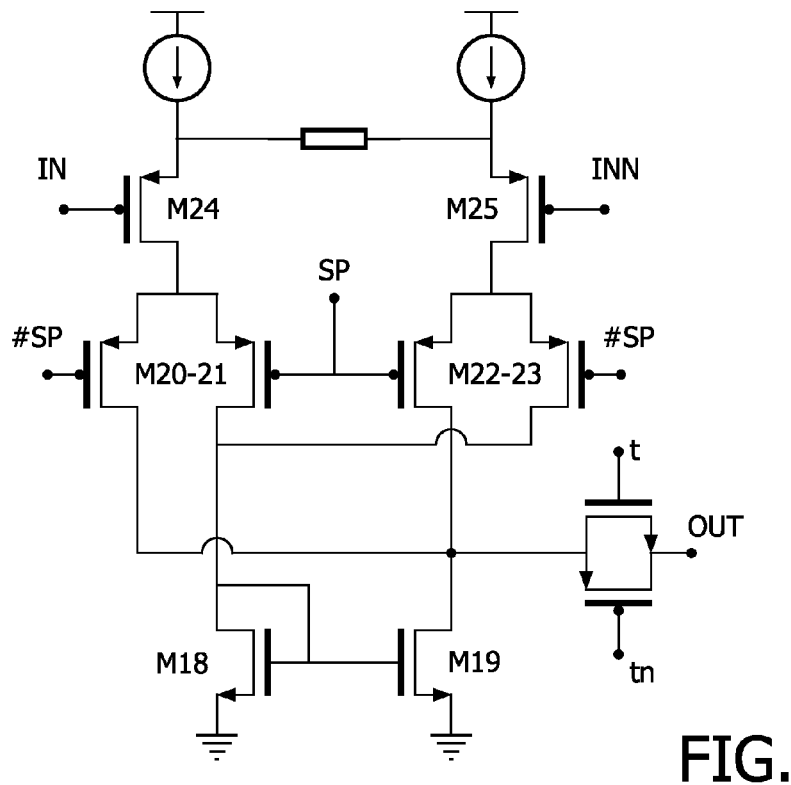
FIG. 11 shows a schematic circuit diagram of a modulator circuit used in an embodiment.

FIG. 11 shows a schematic circuit diagram of the PAM circuit used in the sampling and pulse amplitude modulation circuit 224 of FIG. 9. The PAM circuit is configured as a differential $G_m$ amplifier with a switched output that creates current pulses during the gating period. CMOS transistor pairs M20/M21 and M22/M23 select the polarity of the output according to the detected data supplied to input transistors M24 and M25. Additionally, a current mirror circuit comprising CMOS transistors M18 and M19 equalizes the bias currents in the two differential branches. The circuit output is arranged as a switched output by providing a respective CMOS switch.

Figure 12:
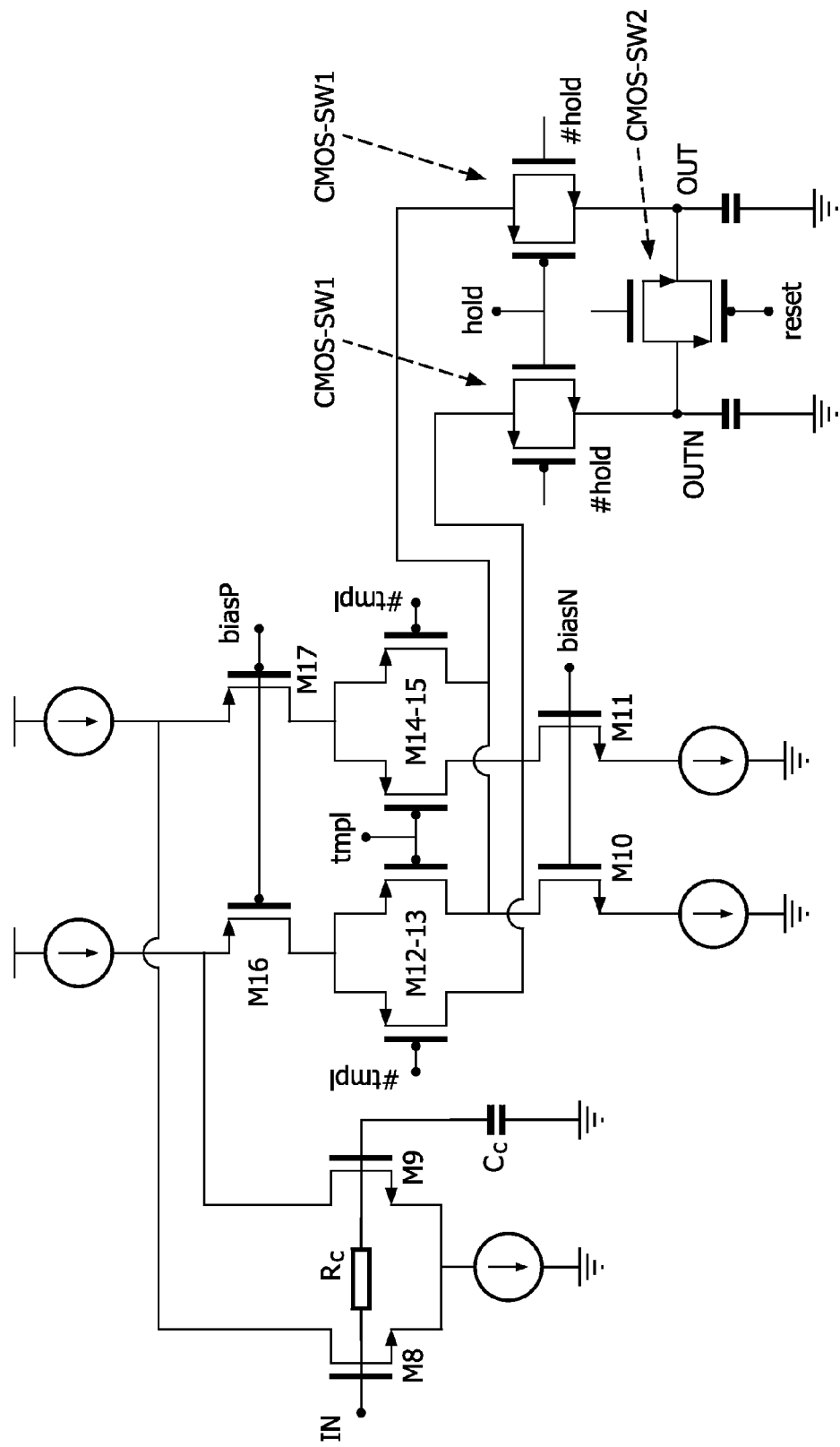
FIG. 12 shows a schematic circuit diagram of a correlator circuit used in an embodiment.

FIG. 12 shows a schematic circuit diagram of an analog correlator circuit which may be used in the embodiment of FIG. 9. The data and phase correlators described above can be equal and implemented as folded cascade $G_m$–C integrators. Here, the multiplication can be performed by inverting the current flow at the output by differential switching transistor pairs M12/M13 and M14/M15 according to the data or synchronization templates applied at their gate terminals. The input signal is supplied via a differential input stage comprising transistors M8 and M9. A resistor $R_c$ and capacitor $C_c$ provided at the input stage realize a differential high-pass filtering (e.g. at 1 MHz) for further suppression of low frequency interference. Positive and negative bias signals are supplied to cascode transistors M10, M11, M16 and M17, respectively. A hold mechanism is provided by a first CMOS switch arrangement CMOS-SW1 with a hold input, while a reset mechanism is provided by a second CMOS switch arrangement CMOS-SW2 with a reset input.

The VCO 236 of FIG. 9 can be implemented as a five stages ring oscillator with a predetermined tuning range (e.g. 34-54 MHz). The loop low-pass filter 234 of the synchronization loop can be implemented as an RC passive filter and can be provided together with the data comparator on a circuit board or on an integrated chip or chip module.

Furthermore, it is noted that the operation of the switch or switch arrangement of the input filter described in the above embodiments can be synchronized with all or at least some of the other signals in the communication device. Hence, corresponding control signal(s) (e.g. clamp signal) of the switch or switch arrangement can be generated based on the receiver timing so that the transitions generated by the transmitter are occurring when the switch is open.

Moreover, it should be noted that the two correlators described in connection with the above embodiments could be implemented also as a single correlator or correlator arrangement for both data detection and synchronization.

The above embodiments can be applied in any implementation or application of BCC systems which are becoming more and more relevant as ultimate solution for low power body-area networks especially for medical applications such as patient monitoring or patient/clinicians automatic identification The electrodes or body couplers could be configured in any number, in any shape, or can be arranged in any geometry. Moreover, the system may be capable of selecting a desirable set of electrodes to be used as signal electrodes or as reference electrodes. Similarly, combining parameters can be determined to combine the signals from the different electrodes. In these ways an electrode configuration with enhanced reception power or quality can be obtained for a given position and orientation with respect to the body, so that optimized and reliable communication can be achieved.

The electrode configuration can be statically (only at start-up) or dynamically (continuously or periodically) selected according to the application scenario. The selection of the configuration can be based e.g. on a capacitance estimation and can be controlled by hardware or software. The system and communication is then much less influenced by position, orientation or movements with respect to the human or animal body.

Additionally, the number of electrodes used as a reference or as signal couplers may be optimized. For example, if a small number of electrodes are enough to enable a correct coupling of the signal to the body, all the other electrodes can be selected as reference electrodes. This provides further optimization since capacitive coupling of the reference electrode(s) to surrounding conductors (earth ground) is one of the parameters that determine signal strength. The more capacitive coupling the stronger the signal.

The plurality of electrodes or electrode segments of the electrode arrangements may be arranged to provide during said body-coupled communication at least one of a horizontal orientation between signal and reference electrodes or electrode segments with respect to the surface of the human or animal body, a vertical orientation between signal and reference electrodes or electrode segments with respect to the surface of the human or animal body, and a signal-only orientation in which said electrode arrangement only consists of signal electrodes, and wherein said plurality of electrodes or electrode segments differ by at least one of orientation and location to an extent sufficient to achieve said coupler diversity. Thereby, a high variety of orientations of individual electrodes or electrode segments can be provided, so that receipt of at least one strong signal is highly probable. In a specific example, the plurality of electrodes or electrode segments may be arranged in a three-dimensional arrangement, which may further increase the diversity gain.

The above embodiments can be implemented as adaptive body-coupled or body-based systems in many domains. In the field of consumer electronics, wireless connections can be set up more easily. As the number of available electronic devices increases (home computer, laptop, pocket pc, mobile phone etc.) the interaction between these devices becomes more and more arduous to set up for common users. As facilitating tool BCC systems can help to connect several different devices using heterogeneous platforms and protocols. For example, with BCC a Bluetooth connection between a laptop and a mobile phone can be set-up by simple touch of the two devices allowing e.g. a photo exchange application.

BCC can also be used to realize applications which provide more convenience in the automotive area. Examples are car entry where a car can be opened by just touching it, theft protection, which allows only operating the car for specified users, wearing an identification tag, car configuration/personalization, which takes away the burden from the user to adjust the car settings to his/her personal preferences, the user is immediately recognized when entering the car.

Moreover, automatic identification is increasingly required in medical applications, both to improve patient safety, and workflow efficiency. Patient identifiers based on body-coupled communication allow for automatic recognition of patients during medical examinations, safe & automatic association of devices, sensors and wireless measurements to individual patients.

In all the above fields of application, the solution described in the above embodiments can be implemented for improved wideband body channel communication.

In summary, a communication apparatus, method and computer program product have been described, which provide a reception approach in a body-coupled communication system with a switch-based filtering in order to remove low frequency interference without attenuating the wanted digital signal, and a receiver structure that makes use of correlation for both data detection and synchronization in order to suppress the uncorrelated interference without attenuating the wanted signal.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of the data and synchronization correlators, e.g. as described in connection with FIGS. 8 and 9, based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. A communication apparatus configured to receive a body-coupled communication signal, said receiver apparatus comprising:
an input filter configured to perform a switch-based filtering of a received signal, the input filter being adapted to shorten differential input couplers used for receiving of said body-coupled communication signal between consecutive receiving periods; and
a correlator arrangement configured to synchronize a receiver timing based on a first correlation between said received signal and a synchronization signal; and configured to decode said received signal by performing a second correlation between said received signal and a reference signal generated based on the receiver timing.

2. The communication apparatus according to claim 1, further comprising a coder configured to code a body-coupled transmission signal by using signal transitions.

3. The communication apparatus according to claim 2, wherein said coder is adapted to apply a spreading code and then a Manchester code.

4. The communication apparatus according to claim 1, wherein said input filter is operated at a frequency substantially equal to the data rate of said received signal.

5. The communication apparatus according to claim 1, wherein said input filter is further connected to an amplifier from an input electrode of said receiver apparatus and adapted to shorten input and output of said amplifier to periodically reset a DC condition.

6. The communication apparatus according to claim 1, wherein said correlator arrangement comprises a first correlator which provides a phase information indicating a phase difference between said received signal and said reference signal, said phase difference being fed to a timing controller so as to adjust the phase of said reference signal.

7. The communication apparatus according to claim 1, wherein at least one of first and second correlators of said correlator arrangement comprises an analog multiplier for multiplication of digital templates of said synchronization signal and said reference signal, respectively, with said received signal.

8. The communication apparatus according to claim 7, further comprising integrators configured to integrate results of said multiplication of digital templates over a receiving period.

9. The communication apparatus according to claim 1, further comprising an oscillator controlled by a sampled and filtered output value of said first correlation, wherein said oscillator is configured to generate an internal clock used as a time base for generating said synchronization signal and said reference signal.

10. The communication apparatus according to claim 1, further comprising a third correlator configured to receive a chip-level output signal of said second correlation and configured to perform symbol-level synchronization.

11. The communication apparatus according to claim 10, wherein said third correlator is configured to perform a digital correlation and said second correlation is an analog correlation.

12. The communication apparatus according to claim 9, further comprising a polarity control element configured to control the polarity of said output value of said second correlation in accordance with the polarity of the decoded signal, wherein an output of said polarity control element is used to control said oscillator via a filter.

13. The communication apparatus according to claim 9, further comprising an accumulator configured to accumulate said output value of said second correlation over a symbol period in order to obtain a symbol level correlation.

14. A method of receiving a body-coupled communication signal, said method comprising:
performing a switch-based filtering of a received signal by shortening differential input couplers used for receiving of said body-coupled communication signal between consecutive receiving periods;
synchronizing a receiver timing based on a first correlation between said received signal and a synchronization signal; and
decoding said received signal by performing a second correlation between said received signal and a reference signal generated based on the receiver timing.

15. A non-transitory computer readable medium including instructions for executing the steps of a method when run on a computing device, the method comprising:
performing a switch-based filtering of a received signal by shortening differential input couplers used for receiving of said body-coupled communication signal between consecutive receiving periods;
synchronizing a receiver timing based on a first correlation between said received signal and a synchronization signal; and
decoding said received signal by performing a second correlation between said received signal and a reference signal generated based on the receiver timing.

* * * * *